United States Patent
Deleule et al.

(10) Patent No.: US 11,397,077 B2
(45) Date of Patent: Jul. 26, 2022

(54) POWER AND SECURITY ADJUSTMENT FOR FACE IDENTIFICATION WITH REFLECTIVITY DETECTION BY A RANGING SENSOR

(71) Applicant: STMICROELECTRONICS, INC., Coppell, TX (US)

(72) Inventors: Arnaud Deleule, Cupertino, CA (US); John E. Kvam, Palo Alto, CA (US); Kalyan-Kumar Vadlamudi-Reddy, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 573 days.

(21) Appl. No.: 16/224,543

(22) Filed: Dec. 18, 2018

(65) Prior Publication Data

US 2019/0212125 A1 Jul. 11, 2019

Related U.S. Application Data

(60) Provisional application No. 62/614,303, filed on Jan. 5, 2018.

(51) Int. Cl.
*G01B 11/02* (2006.01)
*G01C 3/02* (2006.01)
(Continued)

(52) U.S. Cl.
CPC ............ *G01B 11/026* (2013.01); *G01C 3/02* (2013.01); *G01S 17/00* (2013.01); *G01S 17/89* (2013.01);
(Continued)

(58) Field of Classification Search
CPC .. G06F 21/32; G06K 9/00; G06K 9/20; G01S 17/08; G01S 7/4865; G01S 17/89; G01S 17/04; G06T 7/521
See application file for complete search history.

(56) References Cited

U.S. PATENT DOCUMENTS 10,169,671 B2 * 1/2019 Matsimanis ....... G06K 9/00288
10,922,395 B2 2/2021 Morestin et al.
(Continued)

OTHER PUBLICATIONS

Bartels, "Applications for Time-of-Flight Cameras in Robotics, Logistics and Medicine," White Paper BAS1708, Aug. 2017, 7 pages.
(Continued)

*Primary Examiner* — Luke D Ratcliffe
(74) *Attorney, Agent, or Firm* — Seed IP Law Group LLP

(57) ABSTRACT

The present disclosure is directed to a system and method of controlling a facial recognition process by validating preconditions with a ranging sensor. The ranging sensor transmits a ranging signal that is reflected off of a user's face and received back at the ranging sensor. The received ranging signal can be used to determine distance between the user's face and the mobile device or to determine the reflectivity of the user's face. Comparing the distance to a range of distances corresponding to normal operation of the device or normal reflectivities associated with human skin tones can reduce the number of false positive activations of the facial recognition process. Furthermore, a multiple zone ranging sensor can produce a face depth map that can be compared to a stored face depth map or can produce a reflectivity map that can be compared to a stored face reflectivity map to further increase power efficiency and device security.

25 Claims, 12 Drawing Sheets

(51) Int. Cl.
*H04N 5/232* (2006.01)
*G06T 7/521* (2017.01)
*G01S 17/00* (2020.01)
*G01S 17/89* (2020.01)
*G06V 40/16* (2022.01)

(52) U.S. Cl.
CPC ............ *G06T 7/521* (2017.01); *G06V 40/171* (2022.01); *G06V 40/172* (2022.01); *H04N 5/232121* (2018.08)

(56) References Cited

U.S. PATENT DOCUMENTS

| | | | |
|---|---|---|---|
| 2011/0164792 A1* | 7/2011 | Yoon | G06K 9/00899 382/118 |
| 2015/0066494 A1 | 3/2015 | Salvador et al. | |
| 2015/0161434 A1* | 6/2015 | Ross | G06F 21/32 382/118 |
| 2019/0199907 A1* | 6/2019 | Daulton | G01S 19/14 |

OTHER PUBLICATIONS

Haselton, "Samsung Galaxy S8's facial recognition can be tricked with a photo," Mar. 31, 2017, URL=https://www.cnbc.com/2017/03/31/galaxy-s8-facial-recognition-can-be-tricked-with-a-photo.html, download date Jan. 5, 2018, 3 pages.

Microsoft, "Windows Hello face authentication," May 1, 2017, URL=https://docs.microsoft.com/en-us/windows-hardware/design/device-experiences/windows-hello-face-authentication, download date Dec. 28, 2018, 4 pages.

Yoshida, "iPhone X's TrueDepth Module Dissected," Nov. 17, 2017, URL=https://www.eetimes.com/document.asp?doc_id=1332615&page_number=1, download date Dec. 28, 2018, 3 pages.

* cited by examiner

POWER AND SECURITY ADJUSTMENT FOR FACE IDENTIFICATION WITH REFLECTIVITY DETECTION BY A RANGING SENSOR

TECHNICAL FIELD

The present disclosure relates generally to user identification for use in electronic systems using reflectivity detection of skin tone with time-of-flight ranging sensors.

DESCRIPTION OF THE RELATED ART

Electronic devices, such as smart phones, tablets, computers, and many others use various identification techniques for security purposes to allow access to the electronic devices operations only by an authorized user. Such security techniques include finger print identification, facial recognition, passwords and passcodes, and other various security identification techniques to avoid use and access of information by an unintended, unauthorized or unwanted user of the electronic device.

As facial recognition is becoming increasingly more common, spoofing or other security concerns have arisen. Facial recognition is often performed by a user (front) facing camera using optical wavelengths, infrared wavelengths, or both. The image generated by the camera can be analyzed and compared to a stored profile of an authorized user's face to unlock the device.

In addition, some facial recognition systems can be duped with photographs or photos displayed on a screen of another electronic device, or other mediums. Cameras do not capture depth information well, thus a photo of a face can be indistinguishable to the camera from the real face. Cameras are a relatively power intensive component of a mobile device, so it is disadvantageous to have the camera always on and scanning for the user's face.

To reduce power consumption of the camera, some facial recognition processes are triggered with a button press and some are triggered by detecting movement of the mobile device suggesting it is being brought to the user's face. These methods of triggering facial recognition on a camera for a mobile device are subject to error as movements can be misinterpreted and buttons can accidentally be pushed, leading to excessive and unnecessary power consumption by the facial recognition camera.

BRIEF SUMMARY

The present disclosure is directed to a method to assist facial recognition security to prevent the use of a photo from allowing access to an electronic device by an unintended, unauthorized or unwanted user due to improper identification. The present disclosure is directed to detecting reflectivity related to a user's skin and distance with a time of flight or ranging sensor. The reflectivity and distance information can be utilized in a system for controlling a facial recognition security or identification process. The ranging sensor is used to determine if conditions, such as human skin of a user are present and once the conditions are met, can activate the facial recognition process. For example, a camera can then be activated to complete the facial recognition process.

In some embodiments, the ranging sensor determines a reflectivity of a user's face in response to a specific wavelength of light transmitted from the ranging sensor. At 940 nm, human skin has a reflectance factor that is relatively high as compared to other wavelengths of light. The high reflectance factor ensures that there is a sufficiently strong return signal received back at the ranging sensor, while the low variance means that other materials are easier to distinguish from skin tones because they are more likely to fall outside the range of reflectance factors for human skin tones.

This return signal can be used in the facial recognition process. For example, if the reflectivity is within a range of reflectivities corresponding to the normal reflectivity of human skin, then a confirmation of skin reflectivity signal may be output. In response to the confirmation of skin reflectivity signal may be used to activate a camera of the device can be turned on and the facial recognition process can be started. If the reflectivity is outside of this range of reflectivities, then the camera may be turned off or may remain off.

The present disclosure includes a system that incorporates a ranging sensor into an electronic or mobile device having a camera and other processing circuitry either in the camera module or within the electronic device. In some embodiments, the ranging sensor and the camera will have overlapping fields-of-view.

In some embodiments, the ranging sensor determines a distance between a user's face and the electronic device, which can include mobile devices, computers, televisions, or other devices that include security features. If the distance is within a range of distances corresponding to holding the distance away from the user's face, then the system can output a confirmation of face distance signal. This confirmation of face distance signal, alone or in combination with the confirmation of skin reflectivity signal may be used to activate the camera or initiate the facial recognition process. If the distance is outside of this range of distances, then the camera may remain turned off or remain in an off state.

In some embodiments, the ranging sensor determines a reflectivity of a user's face. If the reflectivity is within a range of reflectivities corresponding to the normal reflectivity of human skin, then a camera of the device is turned on and the facial recognition process is started. If the reflectivity is outside of this range of reflectivities, then the camera is turned off or remains off.

In some embodiments, the ranging sensor determines multiple distances between a user's face and the device to create a depth map of the user's face. If the face map matches a stored face map for authorized users, then camera of the device is turned on and the facial recognition process is started. If the face map does not match the stored face map, then the camera is turned off or remains off.

In some embodiments, the ranging sensor determines multiple reflectivities of a user's face to create a reflectivity map of the user's face. If the reflectivity map matches a stored reflectivity map for authorized users, then a camera of the device is turned on and the facial recognition process is started. If the reflectivity map does not match the stored reflectivity map, then the camera is turned off or remains off.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures associated with electronic components and fabrication techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense; that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

The present disclosure is directed to devices, systems, and methods for controlling a facial recognition process that identifies a user of a device. Facial recognitions processes use cameras to generate an image of the user's face for analysis and comparison against a stored profile of the user. A ranging sensor, such as a time-of-flight (TOF) sensor, is coupled to the camera and is used to control the camera. The ranging sensor can detect reflectivity and distance. The reflectivity and distance information, alone or in combination can be processed to assist with the facial authentication protocols.

Figure 7:
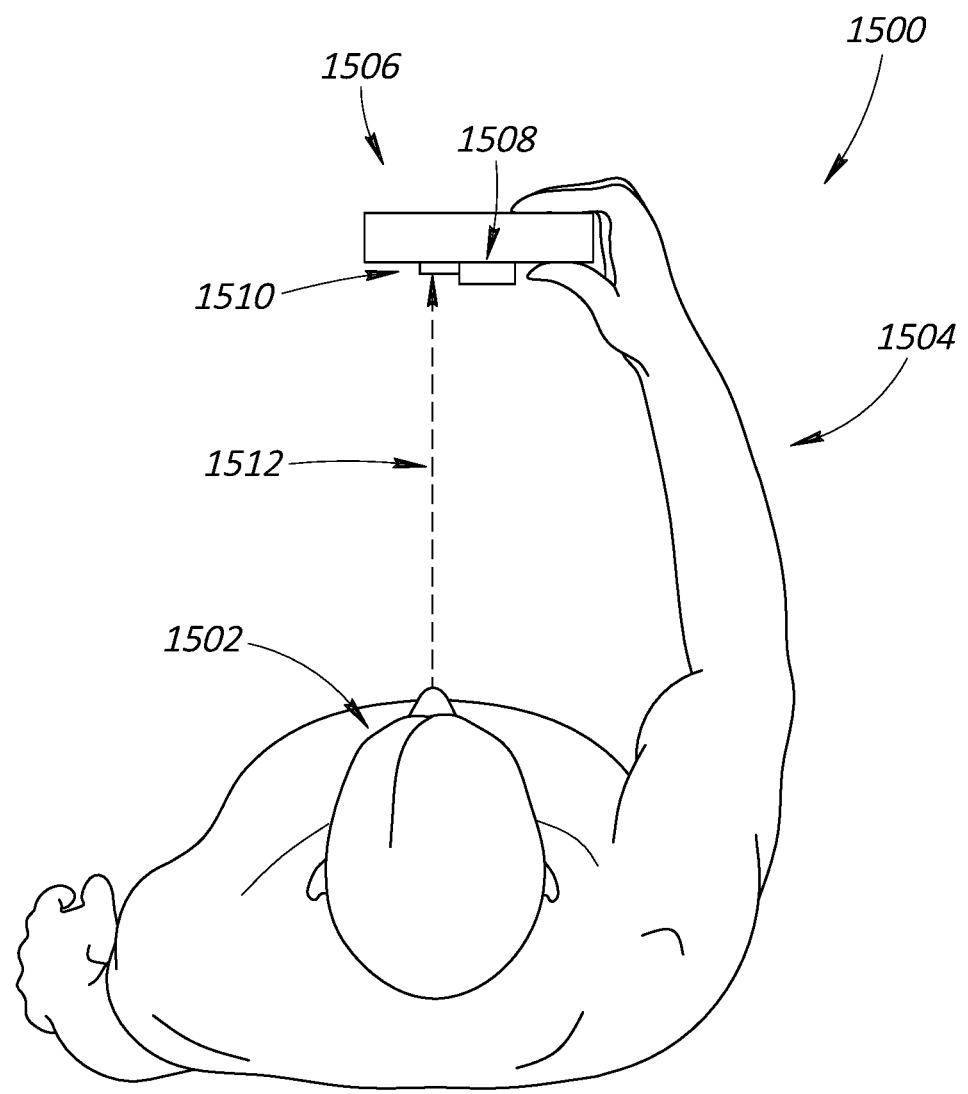
FIG. 7 is a top down illustration of a configuration of the ranging sensor on a device to detect a user's face.

FIG. 7 is a top down illustration of a configuration of the ranging sensor 1510 on a mobile device to detect a user's face. FIG. 7 is one example of how a user 1500 and their face 1502 are evaluated for facial recognition using embodiments of the present disclosure. The user 1500 is shown with an outstretched arm 1504 holding the mobile device 1506, which may be any number of electronic devices. Although illustrated as a hand-held mobile device, the device 1506 could be integrated in to a wall mounted electronic device, a stand-alone electronic device, or any other type of device that incorporates facial recognition into its functions, including security. The mobile device 1506 can be any device, and in some embodiments is a cell phone, tablet computer, or other computing device whether mobile or not. The mobile device 1506 can include any number of features, such as a front facing camera 1508 and the front facing ranging sensor 1510. The device 1506 can also include a user interface, such as a screen, buttons, an audio microphone/speaker, or any other user interface that the user 1500 engages with on the mobile device 1506.

When the user 1500 wants to access the mobile device 1506, the user 1500 brings the mobile device 1506 towards their face and typically holds the mobile device 1506 out in front of them with their arm 1504 such that the mobile device 1506 is a distance 1512 away from the face 1502 of the user 1500. Because the mobile device 1506 is held in this configuration, there is a limited range of distances that are associated with normal use of the mobile device 1506. Specifically, the distance 1512 cannot exceed a length of the arm 1504 because the user 1500 cannot hold the mobile device 1506 beyond their arm reach. Also, the distance 1512 will not be too close because then it becomes difficult to interact with the user interface, such as watching the screen.

The camera 1508 used for facial recognition may be on the front or the back of the device 1506. The camera 1508 may be one of multiple cameras on the mobile device 1506, and may itself be one or more cameras. The camera 1508 used for facial recognition has a field of view pointing away from a front surface of the device 1506 and towards the face 1502 of the user 1500 such that the camera 1508 can image the face 1502 when the device 1506 is used by the user 1500. Similarly, the ranging sensor 1510 has a field of view that points away from the front surface of the device 1506 towards the face 1502 of the user 1500. Thus the fields of view of the camera 1508 and the ranging sensor 1510 overlap at least partially, and in some embodiments are mostly overlapping. As described above, the ranging sensor 1510 detects distance or reflectance to trigger the facial recognition process with the camera 1508 when the distance 1512 or the reflectance is determined to be in the range of parameters.

In some embodiments, the ranging sensor measures the strength of a ranging signal reflected back to calculate reflectivity of the user's face. The reflectivity determined from the ranging signal is compared to a range of reflectivities corresponding to the reflectivity of human skin, with the ranging sensor outputted signals utilized by the facial recognition process based on if the reflectivity corresponds to the reflectivity of human skin. See the discussion below with respect to FIG. 8.

In some embodiments, if the ranging sensor detects that the user's face is at what would be approximately an arm's length distance or that the face is appropriately sized based on the distance, then the ranging sensor's outputted signals could trigger the camera to turn on and run the facial recognition process. If the ranging sensor detects that a user is not at what would be approximately the arm's length distance or that the face is not appropriately sized based on the distance, then the ranging sensor's outputted signals could be utilized to prevent the facial recognition process from starting and turning on the camera.

In some embodiments, a multiple zone array ranging sensor is used to generate a depth map of the user's face. The depth map can then be compared to a stored depth map profile of the user's face, with the ranging sensor controlling the facial recognition process based on if there is a match to the depth map. Alternatively, the multiple zone array can produce a reflectivity map which can be compared to a stored reflectivity map profile of the user's face, with the ranging sensor controlling the facial recognition process based on if there is a match to the reflectivity map related to reflectivity of human skin tones.

These embodiments can supplement the existing facial recognition process and occur between initial legacy condition checks for a device triggering the facial recognition process and the triggering of the camera to run image capture and analysis. These embodiments may reduce the number of false positive requests for the facial recognition process and reducing power loads on the electronic device. These embodiments may also increase the level of security provided by reducing the risk of spoofing of the facial recognition process with images of the user's face.

Figure 1:
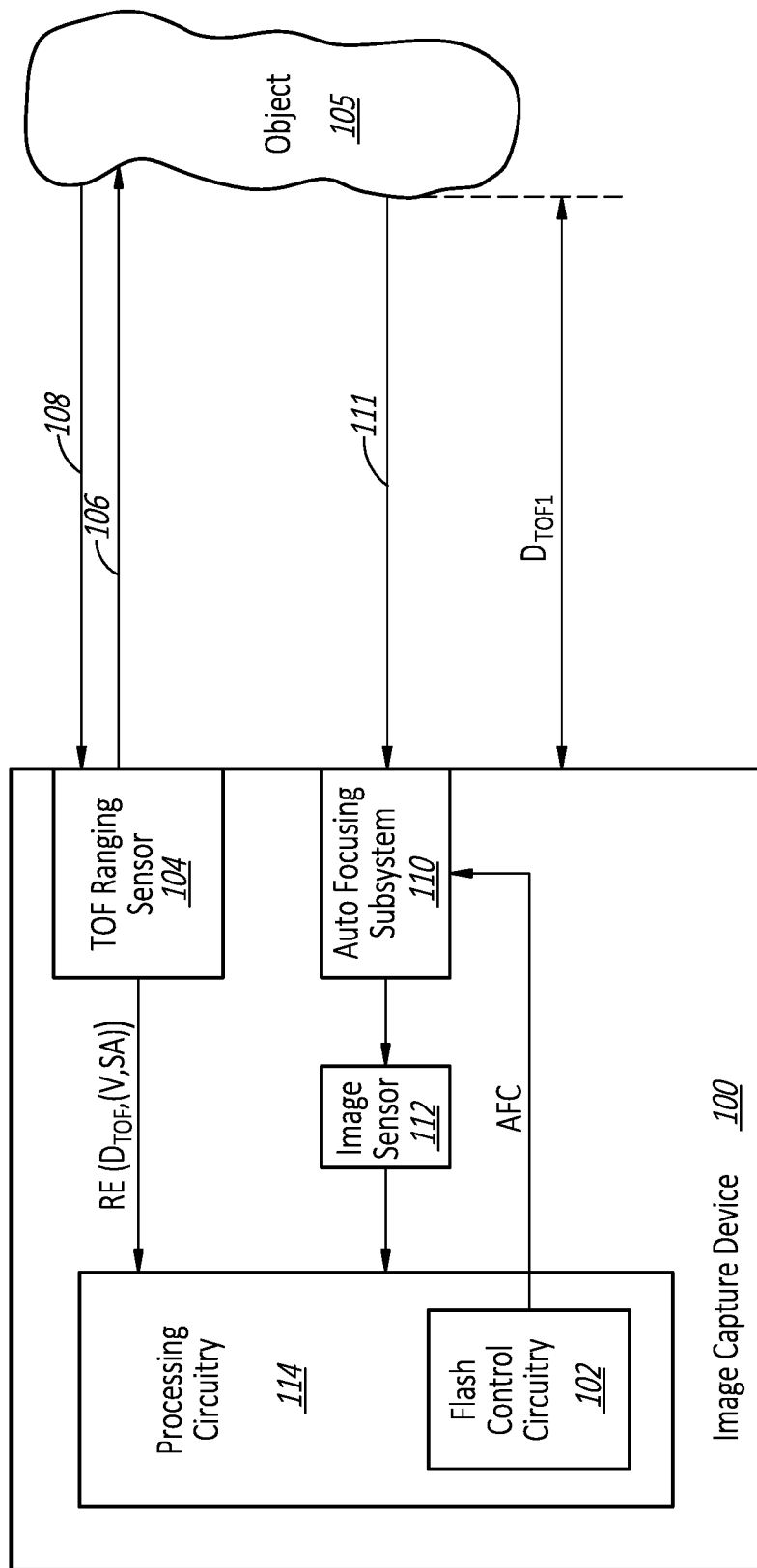
FIG. 1 is a functional block diagram of an image capture device with a time-of-flight (TOF) ranging sensor according to one embodiment of the present disclosure.

FIG. 1 is a functional block diagram of an image capture device 100 including a time-of-flight (TOF) ranging sensor 104 and an image sensor 112. The TOF ranging sensor 104 transmits optical pulse signals 106 that are incident upon objects in the field of view FOV, such as a human face. The transmitted optical pulse signals 106 reflect off the objects and portions of the reflected optical pulse signals propagate back to the TOF ranging sensor 104 as return optical pulse signals 108. The TOF ranging sensor 104 processes the return optical pulse signals 108 to determine distances to the sensed objects and also to determine a reflectivity of the object. Objects have ranges of reflectivity, such as human skin that is within a particular range of reflectivity based on the wavelength of the optical pulse signals 106. Glass and mirrors have a different range of reflectivity based on the wavelength of the optical pulse signals 106. As such, the return optical signals carry information about the object that can be determined by references a look up table or other stored information about reflectivity ranges and the associated type of object.

The objects in the field of view FOV generate the return optical signal and the ranging sensor provides a range estimation signal RE including the sensed distances. The system may include flash control circuitry 102 and an auto focusing subsystem 110 that can be controlled based upon whether the TOF ranging sensor senses a high reflectivity object in a field of view FOV of the image capture device according to one embodiment of the present disclosure. The autofocusing control circuitry 102 then controls focusing of the image capture device 100 based on whether the range estimation signal RE indicates a high reflectivity object has been detected. Said differently, if the ranging sensor detects reflectivity and distance information that aligns with a human's face, then the image sensor 112 can be activated to perform a facial recognition process. This facial recognition process may include a flash control or auto focusing control that may utilize the ranging sensor's detected reflectivity and distance information.

In the present description, certain details are set forth in conjunction with the described embodiments to provide a sufficient understanding of the present disclosure. One skilled in the art will appreciate, however, that the other embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present disclosure.

The image sensor 112 may be any suitable type of image sensor, such as a charge coupled device (CCD) type image sensor or a CMOS image sensor, and captures an image of the object 105 from the light provided by the autofocusing subsystem 110. The image sensor 112 provides captured images to processing circuitry 114, which controls the image sensor to capture images and would typically store the captured images and provide other image capture related processing of the captured images. Any suitable camera and autofocus system can include the features described herein.

The processing circuitry 114 also includes other circuitry for controlling the overall operation of the image capture device 100. The specific structure and functionality of the processing circuitry 114 will depend on the nature of the image capture device 100. For example, the image capture device 100 may be a stand-alone digital camera or may be digital camera components contained within another type of electronic device, such as a smart phone, laptop, front door security device, tablet computer, or any other system that includes facial recognition security features. Thus, in FIG. 1 the processing circuitry 114 represents circuitry contained in the image capture device 100 but also generally represents circuitry of an electronic device, such as a smart phone or tablet computer, where the image capture device 100 is part of another electronic device. For example, where the image capture device 100 is part of a mobile device like a smart phone, the processing circuitry 114 controls the overall operation of the smart phone and also executes applications or "apps" that provide specific functionality for a user of the mobile device.

As illustrated in FIG. 1, the TOF ranging sensor 104 senses a first distance $D_{TOF1}$ to the object 105. Although only one distance is shown, multiple distances can be detected with a single optical pulse, such as different distances associated with a contour of a user's face. Also, if a user is wearing glasses such that a reflectivity of the lenses is different from their cheeks and forehead, the system can detect that a majority of the returned signal represents skin tone and evaluate that there is a high reflectivity, such as glass in a region that has consistent distances such that it is likely the user is wearing glasses.

With a TOF ranging sensor capable of sensing distances to multiple objects or multiple depths of a single object or person, the sensor would provide a range estimation signal RE to the processing circuitry to determine what type of item is being imaged.

As mentioned above, in embodiments of the present disclosure the TOF ranging sensor 104 processes the return optical pulse signals 108 to determine whether an object in the field of view FOV is a human or a piece of paper or a computer screen, and provides the range estimation signal RE including this determination along with the sensed distances. In one embodiment, the TOF ranging sensor 104 also generates as part of the range estimation signal RE a signal amplitude SA for each of the sensed objects. The signal amplitude SA is based on the number of photons of the return optical pulse signals 108 the TOF ranging sensor 104 receives for each of the sensed objects. The closer an object is to the TOF ranging sensor 104 the greater the sensed signal amplitude SA, and, conversely, the farther away the object the smaller the sensed signal amplitude.

In addition, the TOF ranging sensor 104 utilizes the signal amplitude SA detected for each of the sensed objects in determining whether the object is an object having a high reflectivity surface. The TOF ranging sensor 104 includes this determination in the range estimation signal RE in the form of a confidence value CV indicating whether one of the sensed objects is an object having a skin reflectivity range. The processing circuitry then controls the image sensor based upon this confidence value CV, along with the sensed distances $D_{TOF}$ and signal amplitudes SA contained in the range estimation signal RE, as we described in more detail below.

Figure 2:
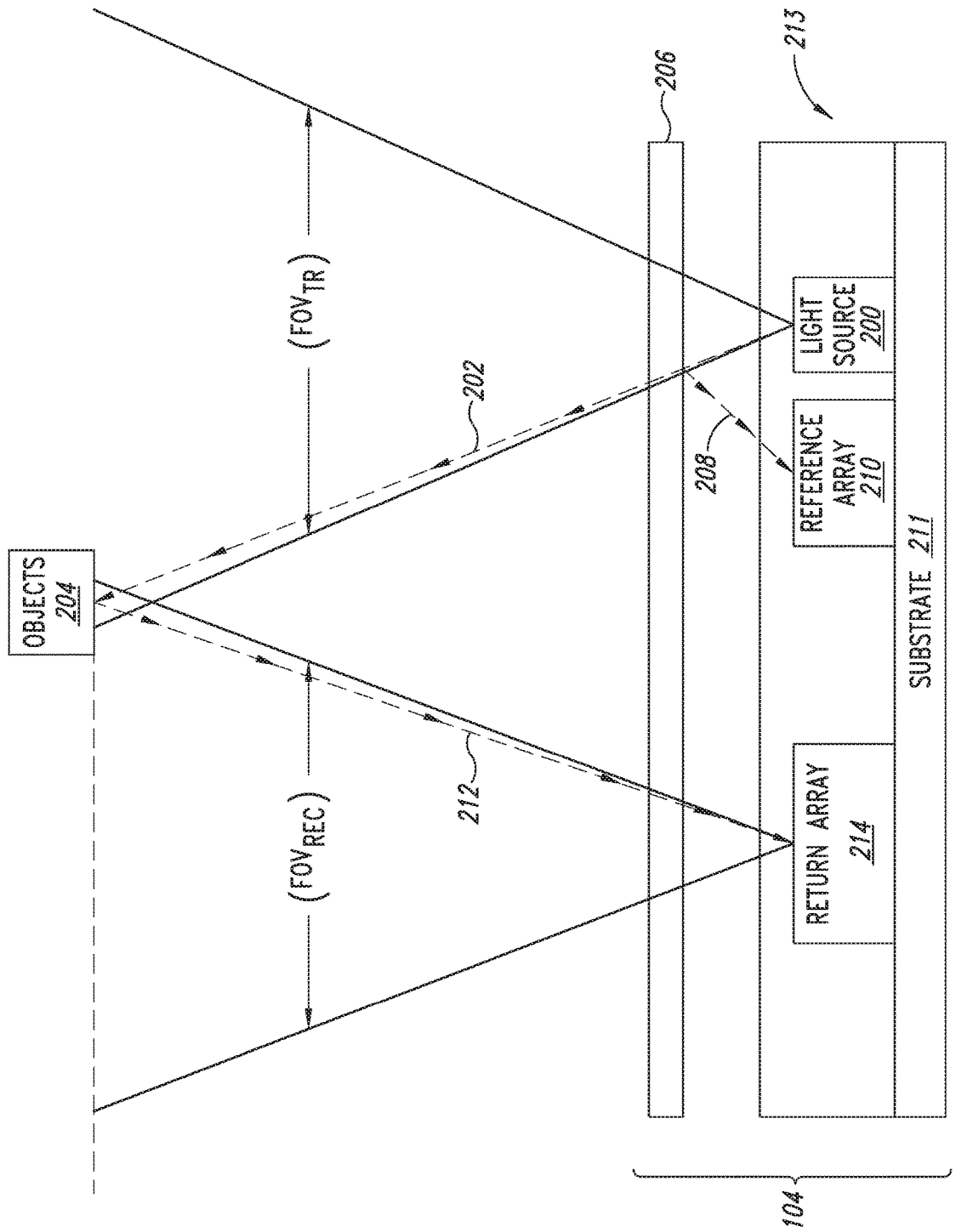
FIG. 2 is a functional diagram illustrating components and operation of the TOF ranging sensor of FIG. 1.

FIG. 2 is a functional diagram illustrating components and operation of the TOF ranging sensor 104 of FIG. 1. The TOF ranging sensor 104 may be a single chip that includes a light source 200 and return and reference arrays of photodiodes 214, 210. Alternatively, these components may be incorporated within the circuitry of the image capture device 100 or other circuitry or chip within an electronic device including the image capture device. The light source 200 and the return and reference arrays 214, 210 are formed on a substrate 211. In one embodiment, all the components of the TOF ranging sensor 104 are contained within the same chip or package 213, with all components except for the light source 200 being formed in the same integrated circuit within this package in one embodiment.

The light source 200 transmits optical pulse signals having a transmission field of view $FOV_{TR}$ to irradiate objects within the field of view. A transmitted optical pulse signal 202 is illustrated in FIG. 2 as a dashed line and irradiates an object 204 within the transmission field of view $FOV_{TR}$ of the light source 200. In addition, a reflected portion 208 of the transmitted optical pulse signal 202 reflects off an integrated panel, which may be within a package 213 or may be on a cover 206 of the image capture device 100. The reflected portion 208 of the transmitted pulse is illustrated as reflecting off the cover 206, however, it may be reflected internally within the package 213.

The cover 206 may be glass, such as on a front of a mobile device associated with a touch panel or the cover may be metal or another material that forms a back cover of the electronic device. The cover will include openings to allow the transmitted and return signals to be transmitted and received through the cover if not a transparent material.

The reference array 210 of light sensors detects this reflected portion 208 to thereby sense transmission of the optical pulse signal 208. A portion of the transmitted optical pulse signal 202 reflects off objects 204 within the transmission field of view $FOV_{TR}$ as return optical pulse signals 212 that propagate back to the TOF ranging sensor 104. The TOF ranging sensor 104 includes a return array 214 of light sensors having a receiving field of view $FOV_{REC}$ that detects the return optical pulse signals 212. The field of view FOV of the image capture device 100 shown in FIG. 1 includes the transmitting and receiving fields of view $FOV_{TR}$ and $FOV_{REC}$. The TOF ranging sensor 104 then determines respective distances $D_{TOF}$ between the TOF ranging sensor and the objects 204 based upon the time between the reference array 210 sensing transmission of the optical pulse signal 202 and the return array 214 sensing the return optical pulse signal 212. The TOF ranging sensor 104 also generates a signal amplitude SA for each of the detected objects 204 and a confidence value CV indicating whether any of the sensed objects is an object having a high reflectance surface, as will be described in more detail below.

Figure 3:
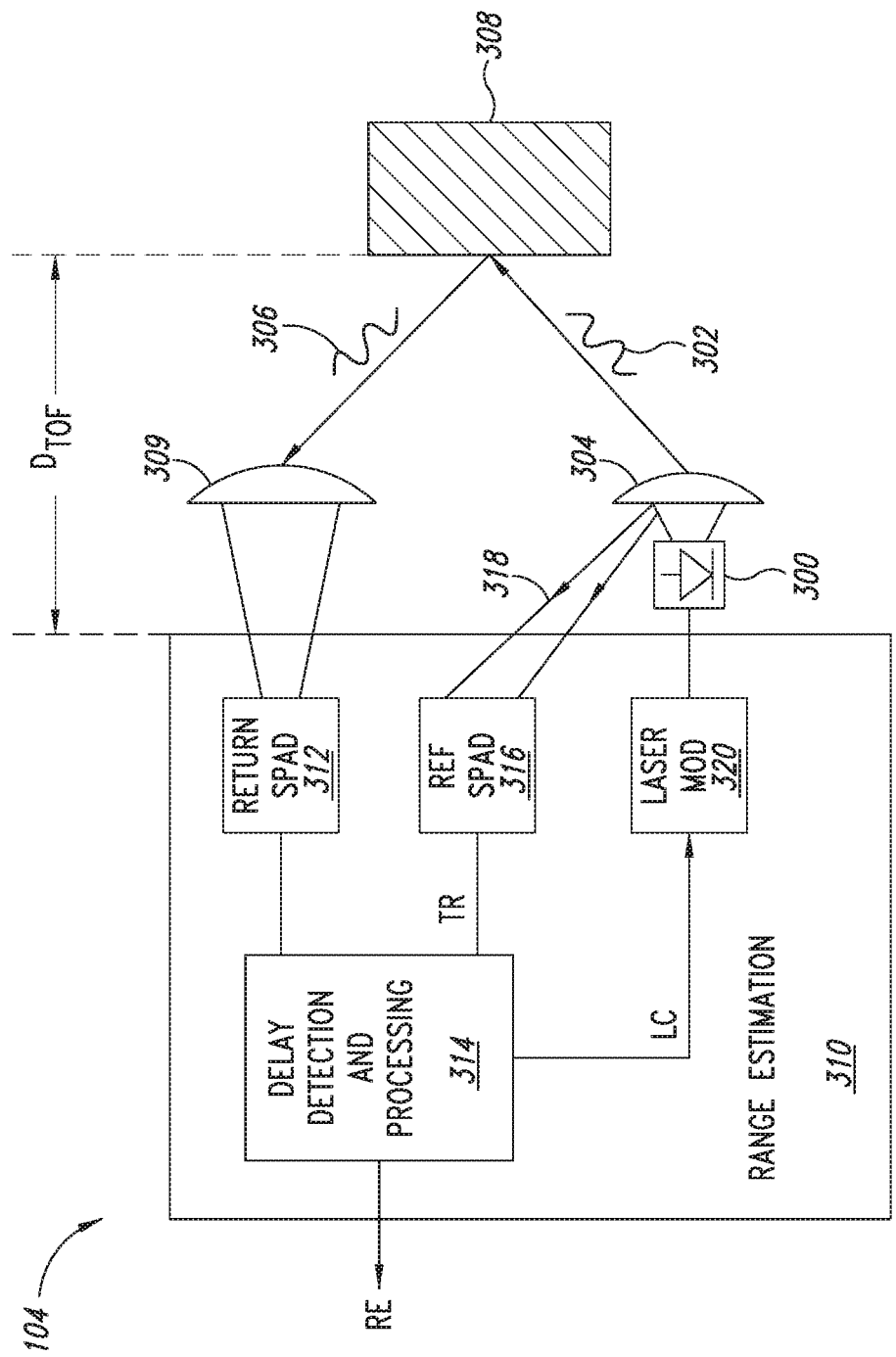
FIG. 3 is a functional block diagram of the TOF ranging sensor of FIGS. 1 and 2 according to one embodiment of the present disclosure.

FIG. 3 is a more detailed functional block diagram of the TOF ranging sensor 104 of FIGS. 1 and 2 according to one embodiment of the present disclosure. In the embodiment of FIG. 3, the TOF ranging sensor 104 includes a light source 300, which is, for example, a laser diode such as a vertical-cavity surface-emitting laser (VCSEL) for generating the transmitted optical pulse signal designated as 302 in FIG. 3. The transmitted optical pulse signal 302 is transmitted in the transmission field of view $FOV_{TR}$ of the light source 300 as discussed above with reference to FIG. 2. In the embodiment of FIG. 3, the transmitted optical pulse signal 302 is transmitted through a projection lens 304 to focus the transmitted optical pulse signals 302 so as to provide the desired field of view $FOV_{TR}$. The projection lens 304 can be used to control the transmitted field of view $FOV_{TR}$ of the sensor 104 and is an optional component, with some embodiments of the sensor not including the projection lens.

The reflected or return optical pulse signal is designated as 306 in FIG. 3 and corresponds to a portion of the transmitted optical pulse signal 302 that is reflected off objects within the field of view $FOV_{TR}$. One such object 308 is shown in FIG. 3. The return optical pulse signal 306 propagates back to the TOF ranging sensor 104 and is received through a return lens 309 that provides the desired return or receiving field of view $FOV_{REC}$ for the sensor 104, as described above with reference to FIG. 2. The return lens 309 in this way is used to control the field of view $FOV_{REC}$ of the sensor 104. The return lens 309 directs the return optical pulse signal 306 to range estimation circuitry 310 for generating the imaging distance $D_{TOF}$ and signal amplitude SA for each object 308. The return lens 309 is an optional component and thus some embodiments of the TOF ranging sensor 104 do not include the return lens.

In the embodiment of FIG. 3, the range estimation circuitry 310 includes a return single-photon avalanche diode (SPAD) array 312, which receives the returned optical pulse signal 306 via the lens 309. The SPAD array 312 corresponds to the return array 214 of FIG. 2 and typically includes a large number of SPAD cells (not shown), each cell including a SPAD for sensing a photon of the return optical pulse signal 306. In some embodiments of the TOF ranging sensor 104, the lens 309 directs reflected optical pulse signals 306 from separate spatial zones within the field of view $FOV_{REC}$ of the sensor to certain groups of SPAD cells or zones of SPAD cells in the return SPAD array 312, as will be described in more detail below.

Each SPAD cell in the return SPAD array 312 provides an output pulse or SPAD event when a photon in the form of the return optical pulse signal 306 is detected by that cell in the return SPAD array. A delay detection and processing circuit 314 in the range estimation circuitry 310 determines a delay time between transmission of the transmitted optical pulse signal 302 as sensed by a reference SPAD array 316 and a SPAD event detected by the return SPAD array 312. By detecting these SPAD events, the delay detection and processing circuit 314 estimates an arrival time of the return optical pulse signal 306. The delay detection and processing circuit 314 then determines the time of flight TOF based upon the difference between the transmission time of the transmitted optical pulse signal 302 as sensed by the reference SPAD array 316 and the arrival time of the return optical pulse signal 306 as sensed by the SPAD array 312. From the determined time of flight TOF, the delay detection and processing circuit 314 generates the range estimation signal RE (FIG. 1) indicating the detected distance $D_{TOF}$ between the object 308 and the TOF ranging sensor 104.

The reference SPAD array 316 senses the transmission of the transmitted optical pulse signal 302 generated by the light source 300 and generates a transmission signal TR indicating detection of transmission of the transmitted optical pulse signal. The reference SPAD array 316 receives an internal reflection 318 from the lens 304 of a portion of the transmitted optical pulse signal 302 upon transmission of the transmitted optical pulse signal from the light source 300, as discussed for the reference array 210 of FIG. 2. The lenses 304 and 309 in the embodiment of FIG. 3 may be considered to be part of the glass cover 206 or may be internal to the package 213 of FIG. 2. The reference SPAD array 316 effectively receives the internal reflection 318 of the transmitted optical pulse signal 302 at the same time the transmitted optical pulse signal is transmitted. In response to this received internal reflection 318, the reference SPAD array 316 generates a corresponding SPAD event and in response thereto generates the transmission signal TR indicating transmission of the transmitted optical pulse signal 302.

The delay detection and processing circuit 314 includes suitable circuitry, such as time-to-digital converters or time-to-analog converters, to determine the time-of-flight TOF between the transmission of the transmitted optical pulse signal 302 and receipt of the reflected or return optical pulse signal 308. The delay detection circuit 314 then utilizes this determined time-of-flight TOF to determine the distance $D_{TOF}$ between the hand 308 and the TOF ranging sensor 104. The delay detection and processing circuit 314 generates a laser control signal LC that is applied to the laser modulation circuit 320 to control activation of the laser 300 and thereby control transmission of the transmitted optical pulse signal 302. The delay detection and processing circuit 314 also determines the signal amplitude SA for each sensed object based upon the SPAD events detected by the return SPAD array 312 for that object.

Figure 4A:
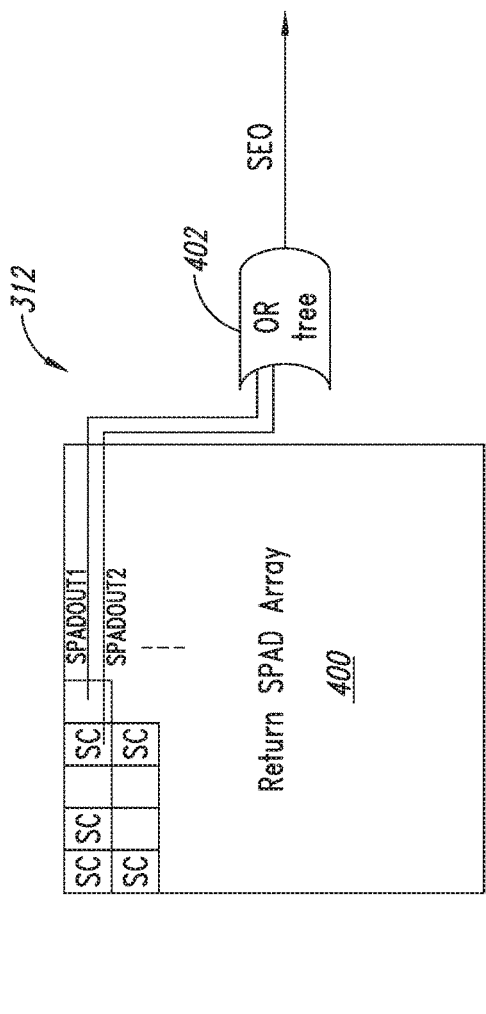
FIGS. 4A and 4B are functional diagrams of single zone and multiple zone embodiments, respectively, of the return single photon avalanche diode (SPAD) array of FIG. 3.

FIG. 4A is a functional diagram of a single zone embodiment of the return SPAD array 312 of FIG. 3. In this embodiment, the return SPAD array 312 includes a SPAD array 400 including a plurality of SPAD cells SC, some of which are illustrated and labeled in the upper left portion of the SPAD array. Each of these SPAD cells SC has an output, with two outputs labeled SPADOUT1, SPADOUT2 shown for two SPAD cells by way of example in the figure. The output of each SPAD cell SC is coupled to a corresponding input of an OR tree circuit 402. In operation, when any of the SPAD cells SC receives a photon from the reflected optical pulse signal 306, the SPAD cell provides an active pulse on its output. In order to get a more accurate estimate of the reflectance of an object in the infrared spectrum, an object is assumed to cover the full field of view of the sensor. In the multiple zone embodiments, the different zones of the return SPAD array effectively have separate, smaller fields of view as discussed with below reference to FIGS. 4B and 7. In these embodiments, there is more confidence of smaller objects at distances $D_{TOF}$ covering the entire field of view of a given zone.

Figure 4B:
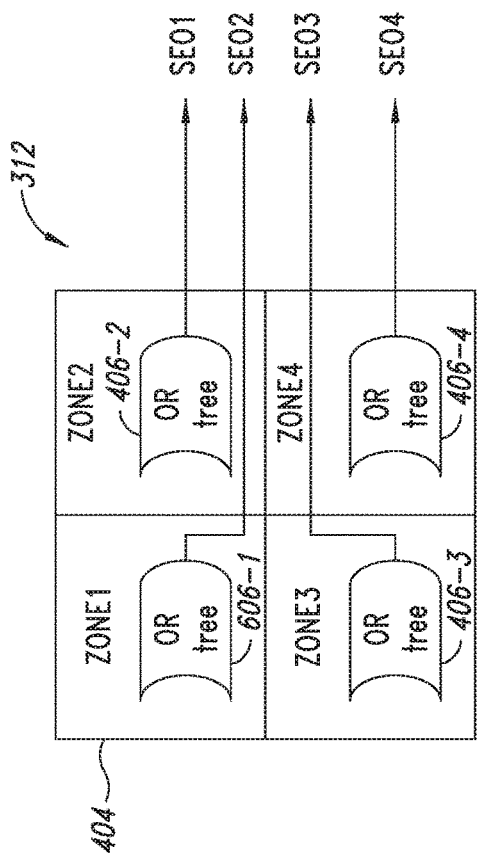

FIG. 4B is a functional diagram of a multiple zone embodiment of the return SPAD array 312 FIG. 3. In this embodiment, the return SPAD array 312 includes a return SPAD array 404 having four array zones ZONE1-ZONE4, each array zone including a plurality of SPAD cells. Four zones ZONE1-ZONE4 are shown by way of example and the SPAD array 404 may include more or fewer zones, such as nine (9) zones or sixteen (16) zones. A zone in the SPAD array 404 is a group or portion of the SPAD cells SC contained in the entire SPAD array. The SPAD cells SC in each zone ZONE1-ZONE4 have their output coupled to a corresponding OR tree circuit 406-1 to 406-4. The SPAD cells SC and outputs of these cells coupled to the corresponding OR tree circuit 406-1 to 406-4 are not shown in FIG. 4B to simplify the figure.

In this embodiment, each of zones ZONE1-ZONE4 of the return SPAD array 404 effectively has a smaller subfield of view corresponding to a portion of the overall field of view $FOV_{REC}$ (FIG. 2).

FIG. 9 is a flowchart illustrating a control process 1400 for initiating a standard face identification procedure for a camera or imaging system based on ranging signals. Various mobile devices, such as cell phones and laptops, are now using facial recognition to identify and authenticate users of the mobile device. A user facing (front facing) camera on the device captures an image of the user in RGB observable wavelengths, in invisible infrared wavelengths, or in both, and a processor on the device analyzes the image against a stored profile of the user's face. The identification aspect of the process distinguishes between different users to match to user profiles on the device, such as for applying user preferences, and the authentication aspect of the process prevents access to all or part of the device by unauthorized users. The facial recognition systems tend to consume large amounts of power to capture the images with the camera and analyze the images with a processor. Furthermore, the facial recognition systems are vulnerable to spoofing with printed images of the face of the user and of electronic images of the face of the user on a device screen or monitor or other mediums as well. Thus, the various blocks of control process 1400 can improve power consumption and security level of the facial recognition process by adding a ranging sensor to the device and analyzing the signals from the ranging sensor to see if they meet a range of parameters associated with expected use conditions. The ranging sensor is added to the device with the facial identification system such that the field-of-view of the camera and the ranging sensor at least partially overlap.

The control process 1400 begins with block 1402, which determines if legacy face identification conditions are satisfied. In some embodiments, legacy conditions include pushing a button on the device to request device access. In other embodiments, legacy conditions include moving the device in a specific motion, such as by lifting a cell phone to your face from your pocket or quickly twisting the phone in the user's hand, which is detected by a gyroscope, an accelerometer or some other movement sensing sensor. Also, a legacy condition can be checking to see if the device is in a locked state. While these legacy conditions can be used to directly initiate the facial recognition process, now the legacy conditions being satisfied initiate the control process 1400.

When the legacy conditions are satisfied in block 1402, a first filter 1404 is applied. This first filter 1404 analyzes a distance from the ranging sensor to determine if the user is trying to activate the facial recognition process. The first filter 1404 begins with block 1406. In block 1406 the ranging sensor, such as a FlightSense TOF ranging sensor, is used to determine a distance from the device to the user's face based on the timing of signals sent and received. The ranging sensor provides the distance value to a processor of the device. The distance can be a true distance or can be a representative value that must be interpreted, such as needing a change in scale or offset, or a change in units, such as a propagation time value to distance.

The distance is sent to the processor of the device for analysis in block 1408. The processor determines if the distance reported by the ranging sensor is within a range of distances. In some embodiments, the range of distances is between 30 cm and 70 cm. In other embodiments, other ranges of distances are possible. In some embodiments, the range of distances represents a typical distance between a device and a user when the user is holding the device in their hand and using the device, as is shown in FIG. 7 and discussed below. In other embodiments, the range of distances can be any range of distances corresponding to a state in which the user wants to initiate the facial recognition process as some facial recognition systems will be in a different structure than a mobile phone, such as fixed to a wall or on a laptop. As such the distance range that is acceptable for the particular device may be selected based on the end use. Distances detected outside the range of distances may be caused by objects in front of the distance sensor, such as a barrier, a spoofing photo, or some other obstruction, or from no face being present and a background object being a large distance from the camera. Thus, when the distance condition is not met, the facial recognition process is not started and the camera is not activated and thus is not consuming extra power. In an alternate embodiment, the processor can generate a warning to be presented to the user in addition to or instead of stopping the facial recognition process from being initiated. The warning can be any audio or visual warning, such as an onscreen message, a notification LED, or an audio tone.

In some embodiments, the first filter 1404 also includes a second distance determination at block 1410. If the distance is less than the range of distances for block 1408, then the processor determines if the distance reported by the ranging sensor is less than a minimum distance in block 1410. In some embodiments, the minimum distance is 1 cm. In other embodiments, other minimum distances are possible. In some embodiments, the minimum distance represents a typical minimum distance between a device and a user when the user is operating the device. If the distance is greater than the minimum distance, the process goes back to block 1402 to check for legacy conditions. If the distance is less than the minimum distance, then the process continues to block 1412. Block 1412 includes issuing a warning to the user that the camera may be blocked. The camera may have an intentional defeat device to prevent risk from hacking, or an unintentional obstruction may be blocking the camera, so the processor issues a warning to the user. The warning can be any audio or visual warning, such as an onscreen message, a notification LED, or an audio tone. After issuing the warning the process returns to block 1402 to check for legacy conditions.

If instead at block 1408 the processor determines that the distance is within the range of distances, the first filter 1404 is satisfied. When the first filter 1404 is satisfied, the control process 1400 can initiate the facial recognition process shown in block 1420. In other embodiments, such as the one shown in FIG. 9, the satisfaction of the conditions for the first filter 1404 cause a second filter 1414 to be applied. The second filter 1414 analyzes the power level of the return signal received at the ranging sensor to determine reflectivity of the surface detected by the ranging sensor, such as the user's face.

In block 1416, high and low reflectivity thresholds are set based on the distance to the detected surface. At certain wavelengths, the reflectivity of human skin is sufficiently high to reliably detect a return signal and also has minimal variation allowing other surfaces to be distinguished. There is however variation in reflectivity based on distance. In some cases, the variation based on distance is caused by the change in field-of-view coverage by the user's face. Thus, in block 1416 the high and low thresholds for reflectivity for human skin are adjusted based on the distance detected by the ranging sensor. The reflectivity can be a true reflectivity or can be a representative value that must be interpreted, such as change in scale or offset, or a change in units, such as a power level value. A more detailed discussion of power levels and reflectivity levels are discussed with respect to later Figures.

In block 1418 the reflectivity (e.g., current signal rate per SPAD) is compared to the range of reflectivities bounded by the thresholds set in block 1416. When the reflectivity condition is not met, the facial recognition process is not started and the camera is not activated and consuming power. The process returns to block 1402 to check for legacy conditions.

If instead at block 1418 the processor determines that the reflectivity is within the range of reflectivities, such as a skin tone reflectivity range the second filter 1414 is satisfied. When the second filter 1404 is satisfied, the control process 1400 can initiate the facial recognition process shown in block 1420. The second filter 1414 may also come before the first filter 1404, in which satisfying the reflectivity requirement would lead to evaluation of conditions for the first filter 1404. Also, just the first filter 1404 or just the second filter 1414 can be implemented in the control process 1400.

When the filters 1404, 1414 are satisfied, the control process initiates the face recognition process at block 1420. This is the legacy face recognition process that used to be directly controlled by the legacy conditions in block 1402. At this block, the camera of the device is turned on, the processor receives and analyzes images of the user's face from the camera, and the device is unlocked when the user's face matches a stored face profile of the user. By checking for the distance between the user and the device, the system may be able to prevent access by someone using a picture of other image of a user to gain access to the system, as a small picture would have to be held to close to the camera. Also, accidental presses in a bag would not trigger the facial recognition process. Additionally, by checking for reflectivity, surfaces such as paper and device screens can identified and denied access to the system. Because an exemplary ranging sensor runs at about 20 mW compared to an exemplary camera which runs at about 200 mW or more, the control process 1400 can reduce power consumption of the device based on false positive requests for facial recognition by 10 to 1000 times and can increase security by reducing the risk of spoofing of the facial recognition system.

In some embodiments, the processor can determine a real size of the face. In these embodiments, a third filter (not depicted) is implemented instead of or in addition to the first and second filters 1404 and 1414. The third filter determines the size of the face by measuring the face in the image captured by the camera, and scaling that image based on the distance detected by the ranging sensor. The range of sizes can be any measurement, such as width, height, diagonal length, or area of the full face or of a part of the face. By way of example, if the face occupies 20% of the width of the image and the distance is detected as 60 cm, the face may be determined to have a real width of 14 cm. Because 14 cm is within the range of sizes for a human head width, the third filter would be satisfied and the facial recognition could be initiated. If instead the face occupies 20% of the width of the image but the distance is detected as 30 cm, the face may be determined to have a real width of 7 cm (such as a photo of the user). Because 7 cm is not within the range of sizes for a human head width, the third filter would not be satisfied and the facial recognition would not be initiated. Therefore, the process returns to block 1402 to check for legacy conditions.

In some embodiments, the ranging sensor can be a multiple zone ranging sensor. In these embodiments, a fourth filter (not depicted) is implemented instead of or in addition to the first and second filters 1404 and 1414 and third filter. The fourth filter captures multiple zones of distance data. A depth map of the face of the users can then be generated and compared to a stored depth map of the user for identification and authentication. With a 64-zone multiple zone ranging sensor the depth map is sufficient to identify a shape of a face from other objects. A 64-zone multiple zone ranging sensor may also be able to identify a particular users from other users. In some embodiments, other amounts of zones are used or the depth map analysis is combined with other security checks to provide additional identification and authentication.

In some embodiments, the ranging sensor can be a multiple zone ranging sensor. In these embodiments, a fifth filter (not depicted) is implemented instead of or in addition to the first and second filters 1404 and 1414 and third and fourth filters. The fifth filter captures multiple zones of reflectivity data. A reflectivity map of the face of the users can then be generated and compared to a stored reflectivity map of the user for identification and authentication. In some embodiments, the reflectivity map analysis is combined with other security checks to provide additional identification and authentication. The multiple zone ranging sensors provide the various depths from the sensor to points on the user's face, which are not present for a photo of a user as the photo is typically a flat surface.

In some embodiments, the image and ranging capture can be of different body parts, such as hands or eyes, or of different objects, such as trinkets or any other object. The parameters for comparing the distance, reflectivity, and depth map can be modified to accept other shapes and surfaces for identification and authentication.

In some embodiments, the processor can store historical information on the results of the facial recognition process and the results of the control process 1400 to compare and adjust the control process 1400 parameters as a form of machine learning. For example, if the user has really long arms and is always holding the phone a greater distance away the range of distances can be adjusted. Similarly, if the user is always wearing heavy makeup then reflectance range can be adjusted to account for this by the processor based on historical data.

Figure 5:
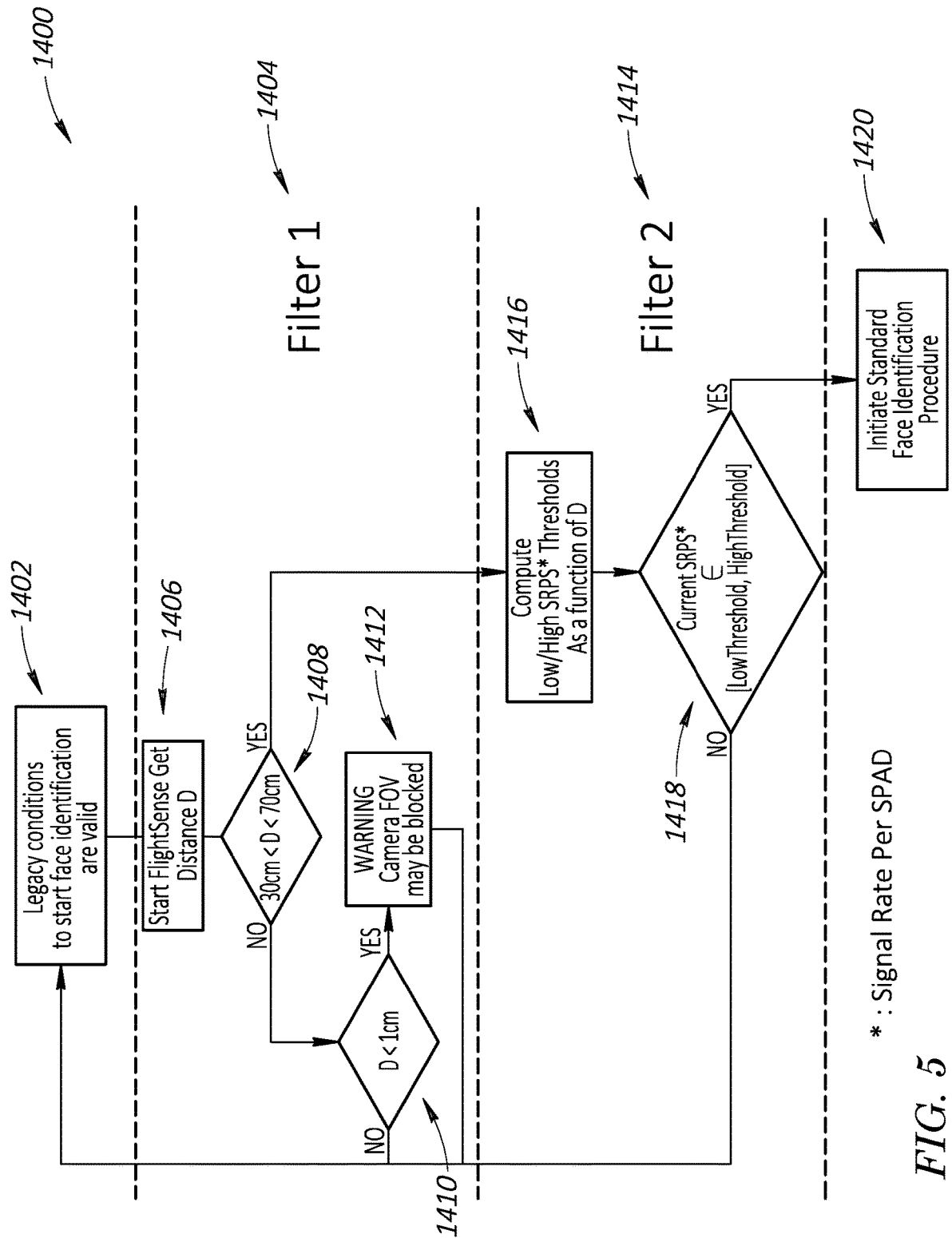
FIG. 5 is a flowchart illustrating a control process for initiating a face identification procedure based on ranging signals.
Figure 6:
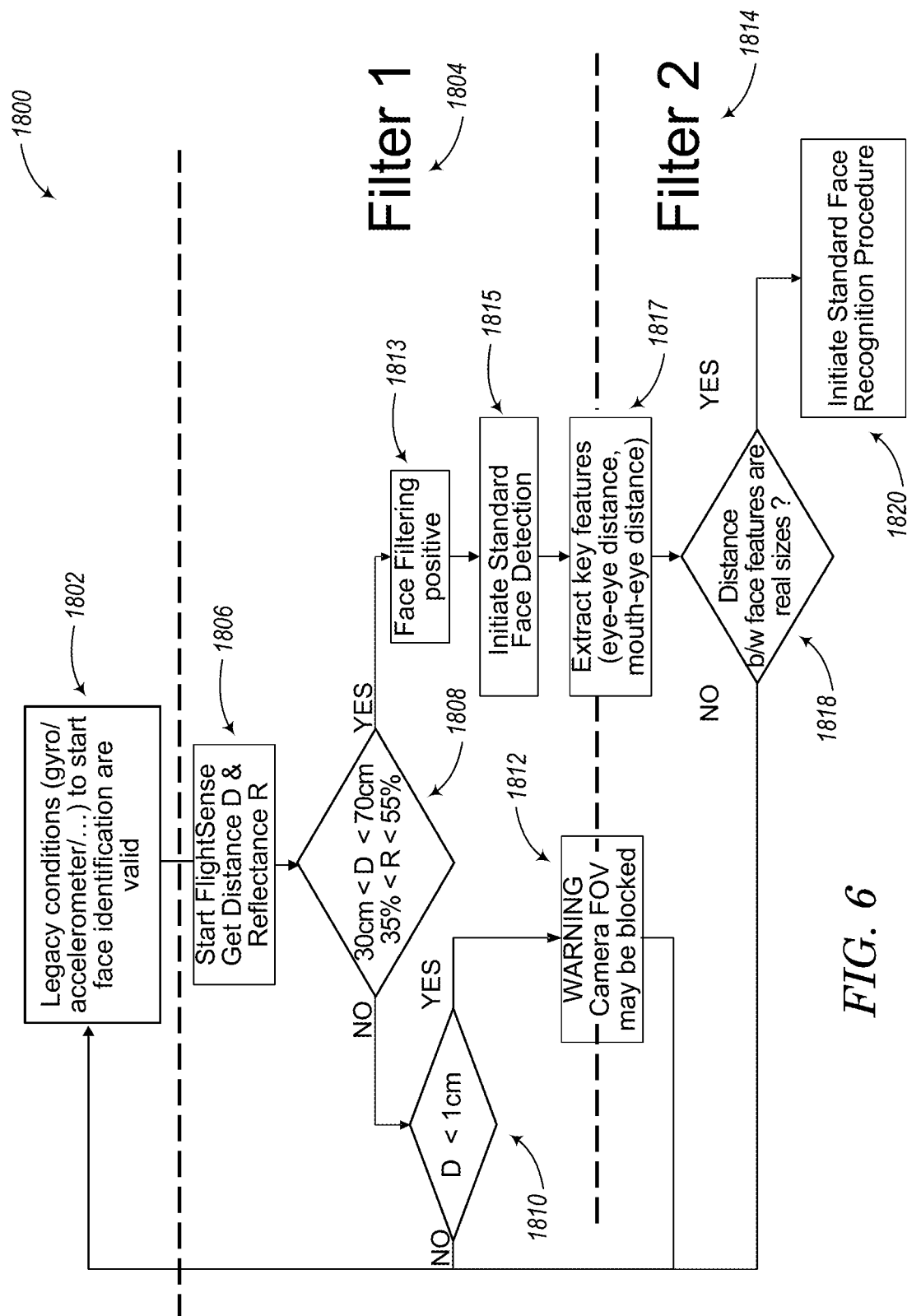
FIG. 6 is an alternative flowchart illustrating a control process for initiating a face identification procedure based on ranging signals.

FIG. 6 is directed to an alternative flowchart illustrating a control process 1800 for initiating a standard face recognition procedure for a camera or imaging system based on ranging signals. The control process 1800 begins with block 1802, which determines if legacy conditions to start face identification are valid. The same applies for the legacy conditions in block 1802 as the legacy conditions of the block 1402 in the control process 1400 in FIG. 5.

When the legacy conditions are satisfied in block 1802, a first filter 1804 is applied. The first filter analyses distance and reflectivity form the ranging sensor to determine if the user is trying to activate the facial recognition process. The first filter 1804 begins with block 1806. In block 1806 the ranging sensor, such as a FlightSense TOF ranging sensor, is used to determine a distance from the device to the user's face based on the timing of optical signals sent and received, and the ranging sensor is used to determine a reflectivity of the user's face based on the strength of the signals sent and received. The ranging sensor provides the distance value and the reflectivity value to a processor of the device.

The distance and the reflectivity are sent to the processor of the device for analysis in block 1808. The processor determines if the distance and the reflectivity reported by the ranging sensor are within a range of distances and a range of reflectance. The ranges are set to correspond to the end use case, such as facial identification with a hand held cell phone as compared to a wall mounted facial identification system. In some embodiments, the range of distances is between a first threshold of 30 cm and a second threshold of 70 cm and the reflectance is between a first threshold of 35% and a second threshold of 55%. In some embodiments, the range of distances and reflectance represents a typical distance and typical reflectance between a device and a user when the user is holding the device in their hand and using the device. In other embodiments, the range of distances and reflectance can be any range of distances or reflectance corresponding to a state in which the user wants to initiate the facial recognition process. Distances and reflectance detected outside the range of distances and reflectance may be caused by objects in front of the ranging sensor, such as a barrier, a spoofing photo, or some other obstruction, or from no face being present and a background object being a large distance from the camera. Thus, when the distance or reflectance condition is not met, the facial recognition process is not started and the camera is not activated to not consume extra power. In an alternate embodiment, the processor can generate a warning to be presented to the user in addition to or instead of stopping the facial recognition process from being initiated. The warning can be any audio or visual warning, such as an onscreen message, a notification LED, or an audio tone.

In some embodiments, the first filter 1804 also includes a second distance determination at block 1810. If the distance is less than the range of distances, then the processor determines if the distance reported by the ranging sensor is less than a minimum distance in block 1810. In some embodiments, the minimum distance is 1 cm. In other embodiments, other minimum distances are possible. In some embodiments, the minimum distance represents a typical minimum distance between a device and a user when the user is operating the device. If the distance is greater than the minimum distance, the process goes back to block 1802 to check for legacy conditions. If the distance is less than the minimum distance, then the process continues to block 1812. Block 1812 includes issuing a warning to the user that the camera may be blocked. The camera may have an intentional defeat device to prevent risk from hacking, or an unintentional obstruction may be blocking the camera, so the processor issues a warning to the user. The warning can be any audio or visual warning, such as an onscreen message, a notification LED, or an audio tone. After issuing the warning the process returns to block 1802 to check for legacy conditions.

In some embodiments, the range of reflectance represents a typical reflectance of human skin in a dark environment or a high ambient environment. In other embodiments, the range of reflectance can be any range of reflectance corresponding to a state in which the user wants to initiate the facial recognition process. Reflectivity detected outside the range of reflectance may be caused by a spoofing photo, or an electronic device with an image, or some other obstruction, or from no face being present and an object having a greater or lesser reflectance than human skin. Thus, when the reflectance condition is not met, the facial recognition process is not started and the camera is not activated and is not consuming extra power. In an alternate embodiment, the processor can generate a warning to be presented to the user in addition to or instead of stopping the facial recognition process from being initiated. The warning can be any audio visual warning, such as an onscreen message, a notification LED, or an audio tone.

If instead at block 1808 the processor determines that the distance is within the range of distances and within the range of reflectance, the first filter 1804 is satisfied and a face filtering positive 1813 is determined. When the first filter 1804 is satisfied and face filtering positive 1813 is determined, the control process 1800 can initiate standard face detection 1815. Once the standard face detection 1815 is initiated in block 1817 the ranging sensor transmits and receives multiple signals to determine various facial feature distances of the intended user. The information from the ranging sensor about distance information from the facial features to the sensor can be merged with the image data to determine eye to eye distance, mouth-eye distance, and ear-ear distance. These measurements can be used for more secure facial identification to confirm that the face is an authorized user's face.

At 1818, the facial feature to feature measurements are evaluated to determine if they are reasonable facial feature dimensions. There can be a look up table or other database of reasonable facial feature dimensions that the detected feature to feature measurements from the ranging sensor and image sensor information can be compared to.

The ranging sensor sends the received signals to the processor to determine the facial feature distances. A second filter 1814 utilizes the facial feature distances determined by the ranging sensor and the processor from block 1817 to determine if the distances between the facial features are appropriate based on a personalized distances map of a user's facial distances or general distance map of a user's facial distances. If the second filter 1814 is not satisfied and the distances between the facial features are not appropriate then the process goes back to block 1802. If the second filter 1814 is satisfied that the distances between facial features are appropriate then the process goes onto initiate a standard facial recognition procedure in block 1820. At block 1820 the camera of the electronic device activates to complete the standard face recognition procedure.

Figure 8:
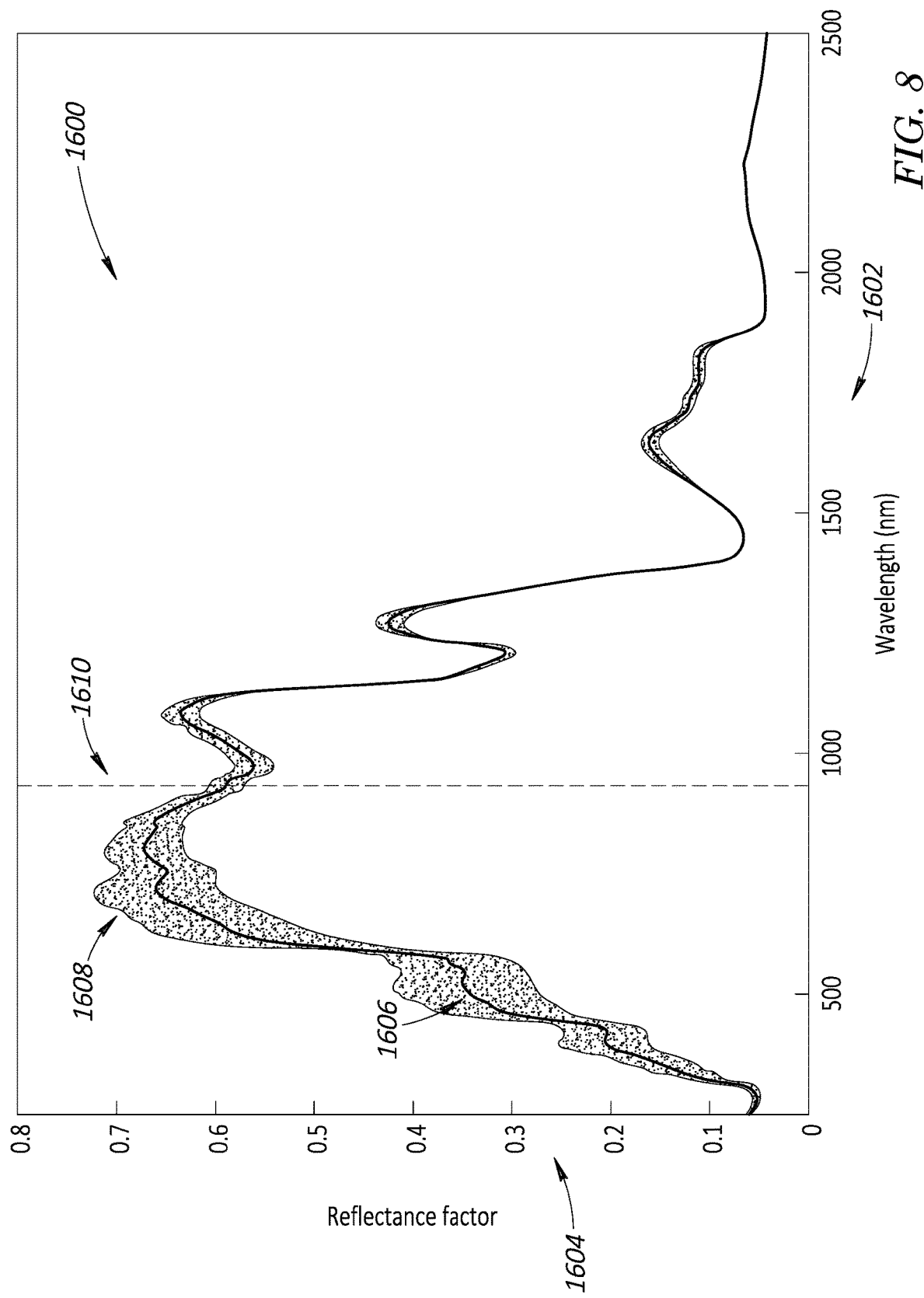
FIG. 8 is a graph illustrating reflectivity of human skin based on wavelengths of light.

FIG. 8 is a graph 1600 illustrating reflectivity of human skin based on wavelength of light. The graph 1600 has an X-axis 1602 for wavelength of light in nanometers (nm) increasing from 0 nm to 2500 nm. The graph 1600 has a Y-axis 1604 for reflectance factor increasing from 0 to 0.8. Reflectance factor is defined as a ratio of light reflected from a surface relative to light reflected from a perfectly reflecting surface under the same geometric and spectral conditions. The reflectance factor can be calculated using the power level of a reflected ranging signal received at the ranging sensor.

The graph 1600 includes a line 1606 which represents a median reflectance of human skin tones observed in a sample of people. The line 1606 has a reflectance factor of about 0.05 at a wavelength just above 0 nm, which increases to a maximum of reflectance factor of about 0.65 at a wavelength of about 800 nm. The line 1606 then follows an undulating and decreasing pattern as the wavelength increases until the line 1606 ends with a reflectance factor of about 0.05 at 2500 nm of wavelength.

The graph 1600 includes a patterned area 1608 which represents a variance of reflectance of human skin tones observed in the sample of people. The patterned area 1608 depicts the spread of the reflectance factors for each wavelength. For example, at a wavelength of 2000 nm, the patterned area 1608 is indistinguishable from the line 1606, meaning that the variance is negligible. Alternatively, at a wavelength of 750 nm the patterned area 1608 extends about 0.05 above and below the line 1606, suggesting a large variance in the reflectance factor of human skin tones at that wavelength. The variance can be due to a wide range of factors, including percent of the field of view of the sensor the face is covering, distance to the face, the color of the user's skin, the oiliness of the skin, the hair color and amount of hair on the head, glasses, hats, scarves, makeup, and the background, all of which are normal variations for a user that need to be accounted for in establishing permissible parameters for reflectivity. The variance can also be due to the ranging sensor not having a user's face in its field of view or the user's face being depicted on a photo or screen. These variances can be excluded based on the reflectance factor differences being greater than the normal variance for the user's face.

The graph 1600 also includes a dashed line 1610 delineating a wavelength of 940 nm. The wavelength of 940 nm was selected for the ranging sensor in part because of the reflectance factor being relatively high at that wavelength while the variance was relatively low compared to other wavelengths under consideration. The high reflectance factor ensures that there is a sufficiently strong return signal received back at the ranging sensor, while the low variance means that other materials are easier to distinguish from skin tones because they are more likely to fall outside the range of reflectance factors for human skin tones. Using reflectance percentage instead of reflectance factor, some exemplary ranges of reflectance percentages for a user's face are 45% to 60% and 35% to 55% at a wavelength of 940 nm and a nominal brightness. These ranges of 15% to 20% are broader than the expected range values for human skin tones of 10% to 15% (at a wavelength of 940 nm) to reduce the number of false negatives.

In some embodiments, the reflectance factor is checked for an overall reflectance of the entire field-of-view of the ranging sensor. In other embodiments, a multiple zone ranging sensor is used, and each zone can be independently evaluated for reflectance. Data from some zones may be dismissed if there is no distance data within parameters for that zone. Data from zones with in-range distance data may be aggregated together or may form a unique profile to be checked against a stored profile, similar to how the depth map for the distance data can be compared to a stored profile.

Figure 9A:
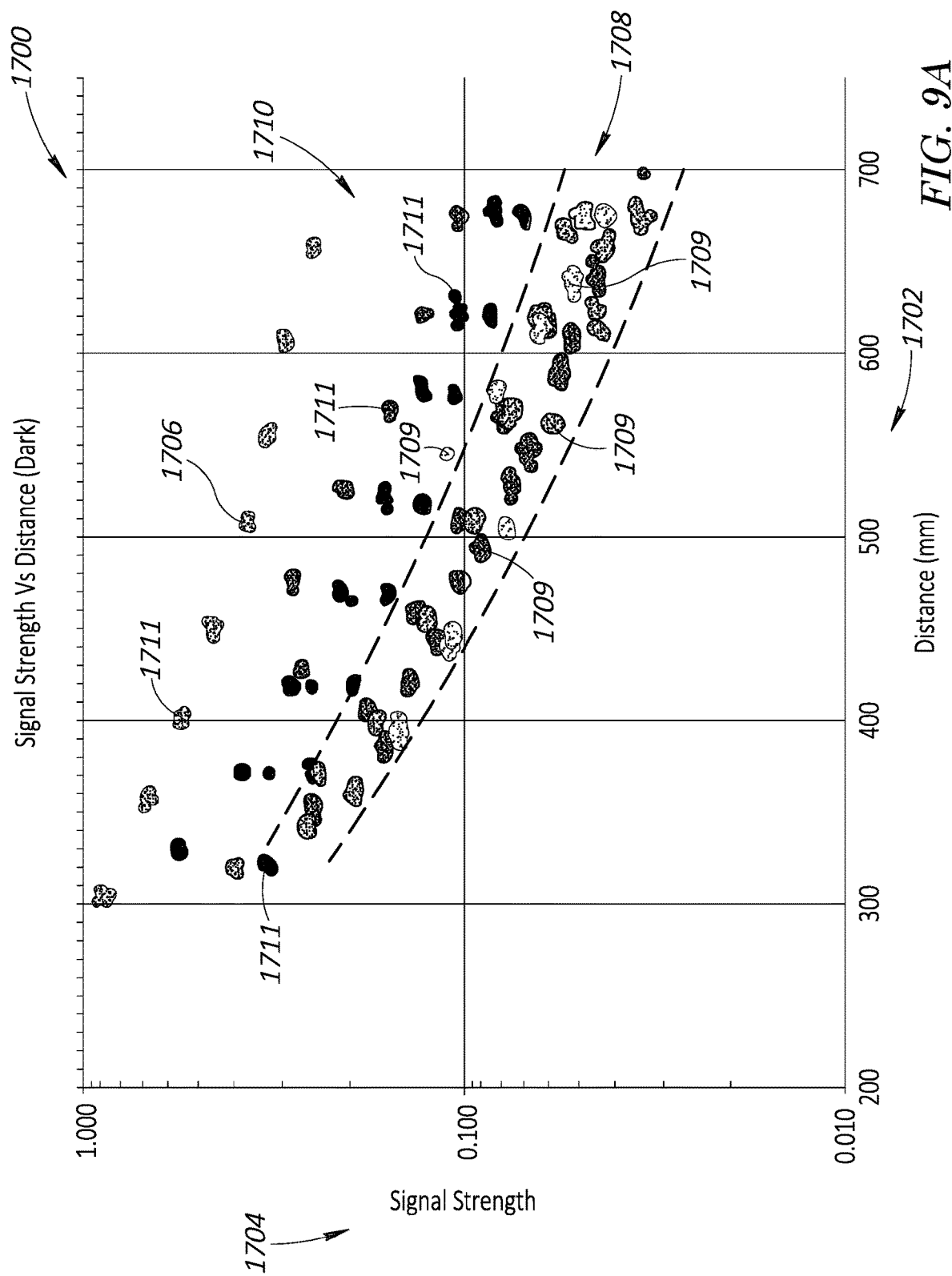
FIGS. 9A-9D are graphs showing various measures of reflectivity of various surfaces with respect to distance and brightness.
Figure 9B:
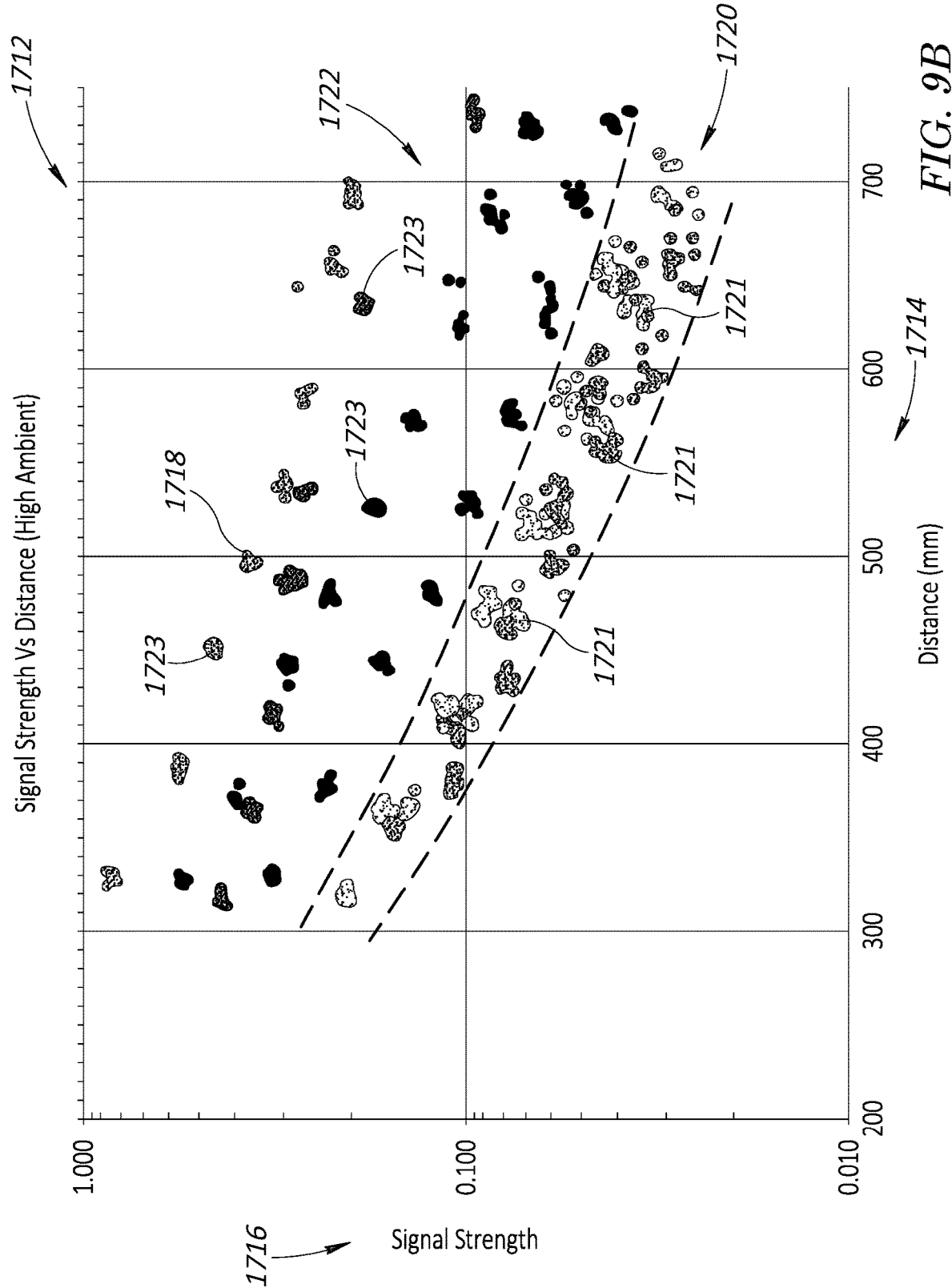
Figure 9C:
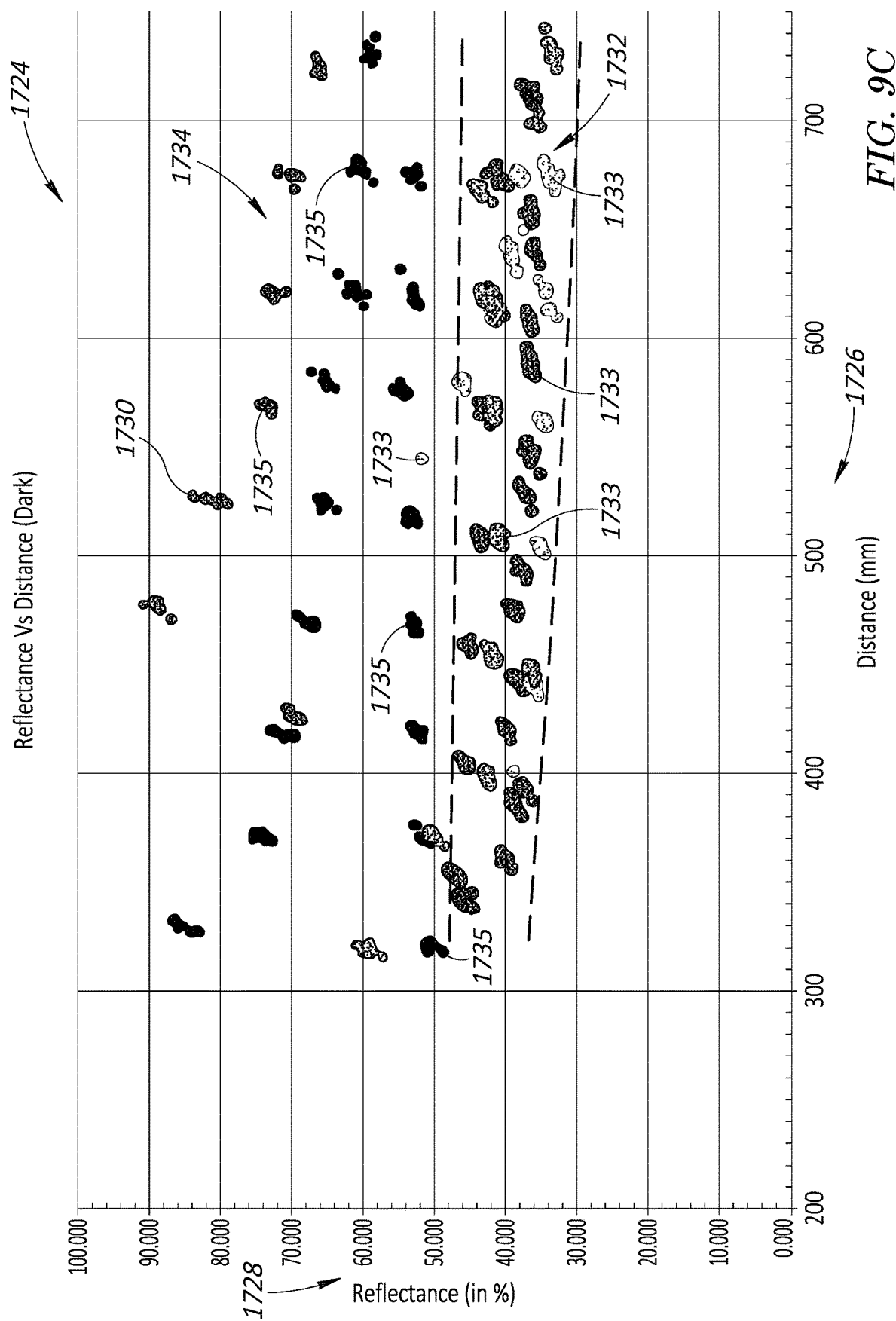
Figure 9D:
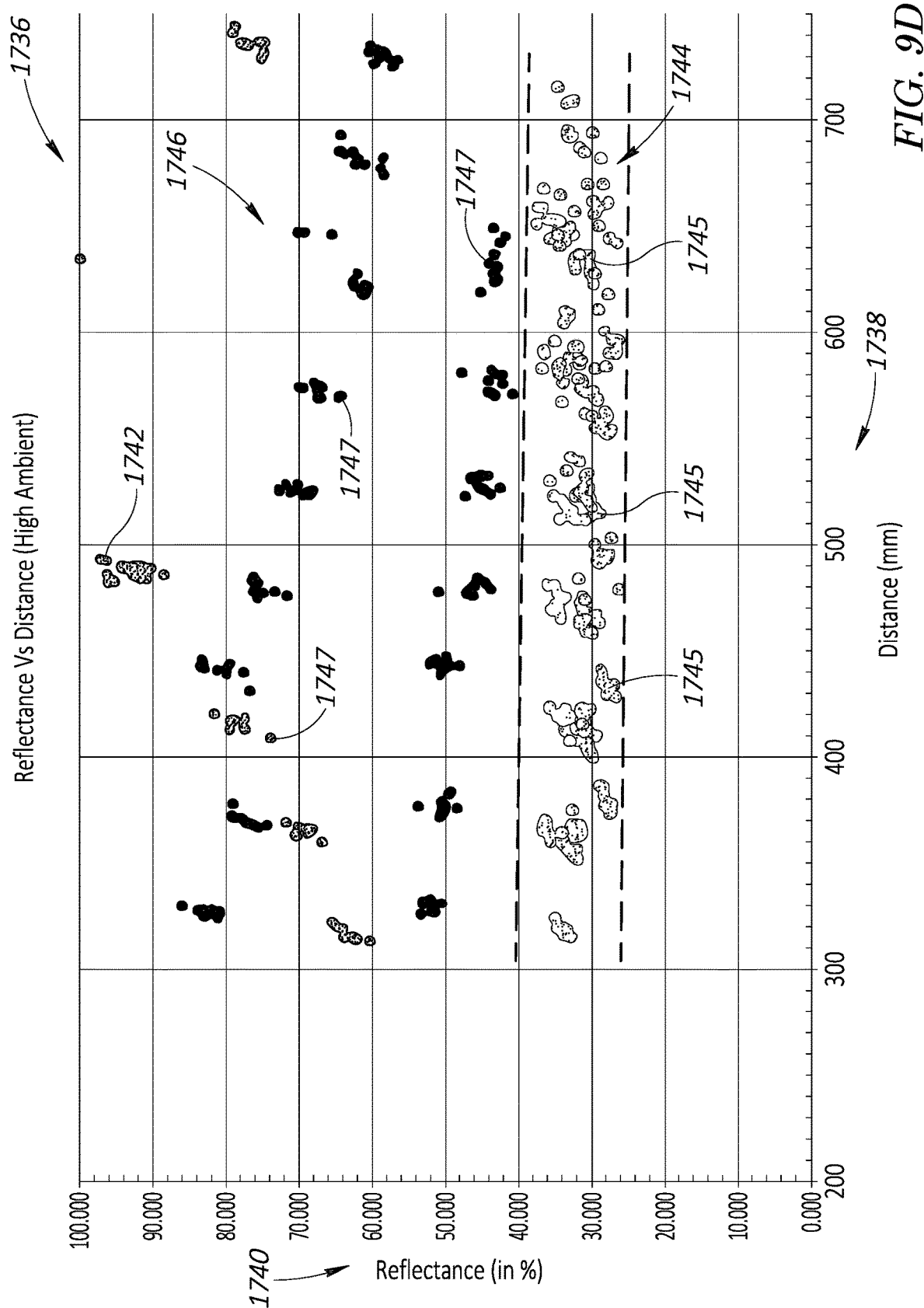

The graph 1600 represents reflectance factor values at a single nominal brightness level and distance. The brightness and distance can vary causing a variance that is predictable and can be accounted for in the ranges of parameters. FIGS. 9A-19D are graphs showing various measures of reflectance of various surfaces with respect to distance and brightness. These Figures each depict a large X-Y scatter plot with data point sets for a plurality of different surfaces, each set with different patterning of the data points. The X-Y scatter plots depict signal strength or reflectivity as a function of distance between a single zone ranging sensor operating with a 940 nm wavelength and for each of the different test subjects used, with testing done between 30 cm and 70 cm. FIGS. 9A and 9C represent dark conditions in a closed dimly lit room, whereas FIGS. 9B and 9D represent high ambient conditions in which halogen bulbs were used to simulate high sunlight (about 60-70 kcps/SPAD) at the 940 nm wavelength. Additionally, FIGS. 9A and 9B depict a logarithmic Y-axis of signal strength and FIGS. 9C and 9D depict a linear Y-axis of reflectivity percentage.

Each of the FIGS. 9A-9D have clusters of data points with some clusters having different patterning. Similar patterning reflects a common test subject and different patterning reflects a different test subject. For example, a plurality of different people were used with different skin types, each person assigned a different patterning of the data clusters. Also, photos of people were used, some on regular paper, and some on glossy paper, with a range of different exposure levels, each one also assigned a different patterning of the data clusters. An electronic image of a face was also tested, with it being assigned its own data cluster patterning.

FIG. 9A includes a graph 1700 for reflected signal strength versus distance in the dark. The graph 1700 has an X-axis 1702 for distance between the ranging sensor and the test subject in millimeters (mm) increasing from 200 mm to 700 mm, and a Y-axis 1704 for signal strength increasing from 0.010 to 1.000 on a logarithmic scale. Data clusters 1706 are scattered across the graph 1700. The data clusters are split between different test subjects using different patterning. A real person data band 1708 includes real person data clusters 1709 that are attributed to real people with at least one real person data cluster 1709 appearing outside of the real person data band 1708. The areas outside of the real person data band 1708 are the non-person data areas 1710. The non-person data areas 1710 includes non-person data clusters 1711 that are attributed to objects other than real people, such as photos, with at least non-person data cluster 1711 appearing outside of the non-person data areas 1710. As can be appreciated from FIG. 9A, the majority of the real people fall within a distinct band of data separate from the data areas in which objects other than the real people fall, with some outliers as exceptions. Thus the real person data band 1708 can be used to calculate ranges of reflectivity for the second filter 1414 after the distance is determined and the background light level is known. For example, in a dark environment at a distance of 600 mm, the range of signal strengths would be approximately from 0.04 to 0.07 signal strength, as can be appreciated from FIG. 9A.

FIG. 9B includes a graph 1712 for reflected signal strength versus distance in high ambient light. The graph 1712 has an X-axis 1714 for distance between the ranging sensor and the test subject in millimeters (mm) increasing from 200 mm to 700 mm, and a Y-axis 1716 for signal strength increasing from 0.010 to 1.000 on a logarithmic scale. Data clusters 1718 are scattered across the graph 1712. The data clusters 1718 are split between different test subjects using different patterning. A real person data band 1720 includes real person data clusters 1721 that are attributed to real people. In some embodiments real person data clusters 1721 may appear outside of the real person data band 1720. The areas outside of the real person data band 1720 are the non-person data areas 1722. The non-person data areas 1722 include non-person data clusters 1723 that are attributed to objects other than real people, such as photos. In some embodiments non-person data clusters 1723 may appear outside of the non-person data areas 1722. As can be appreciated from FIG. 9B, the real people fall within a distinct band of data separate from the data areas in which objects other than the real people fall. Thus the data band 1720 can be used to calculate ranges of reflectivity for the second filter after the distance is determined and the background light level is known. For example, in a high ambient environment at a distance of 600 mm, the range of signal strengths would be approximately from 0.03 to 0.06 signal strength, as can be appreciated from FIG. 9B.

FIG. 9C includes a graph 1724 for reflectance versus distance in the dark.

The graph 1724 has an X-axis 1726 for distance between the ranging sensor and the test subject in millimeters (mm) increasing from 200 mm to 700 mm, and a Y-axis 1728 for reflectivity percentage increasing from 0% to 100% linearly. Data clusters 1730 are scattered across the graph 1724. The data clusters 1730 are split between different test subjects using different patterning. A real person data band 1732 includes real person data clusters 1733 that are attributed to real people with at least one real person data cluster 1733 appearing outside of the real person data band 1732. The areas outside of the real person data band 1732 are the non-person data areas 1734. The non-person data areas 1734 include non-person data clusters 1735 that are attributed to objects other than real people, such as photos, with at least non-person data cluster 1735 appearing outside of the non-person data area 1734. As can be appreciated from FIG. 9C, the majority of the real people fall within a distinct band of data separate from the data areas in which objects other than the real people fall, with some outliers as exceptions. Thus the data band 1732 can be used to calculate ranges of reflectivity for the second filter after the distance is determined and the background light level is known. For example, in a dark environment at a distance of 600 mm, the range of reflectivities would be approximately from 32% to 47% reflectance, as can be appreciated from FIG. 9C.

FIG. 9D includes a graph 1736 for reflectance versus distance in high ambient light. The graph 1736 has an X-axis 1738 for distance between the ranging sensor and the test subject in millimeters (mm) increasing from 200 mm to 700 mm, and a Y-axis 1740 for reflectivity percentage increasing from 0% to 100% linearly. The data clusters 1742 are scattered across the graph 1736. The data clusters 1742 are split between different test subjects using different patterning. A real person data band 1744 includes real person data clusters 1745 that are attributed to real people. In some embodiments real person data clusters 1745 may appear outside of the real person data band 1744. The areas outside of the real person data band 1744 are the non-person data areas 1746. The non-person data areas 1746 includes non-person data clusters 1747 that are attributed to objects other than real people, such as photos. In some embodiments non-person data clusters 1747 may appear outside of the non-person data areas 1746. As can be appreciated from FIG. 9D, the real people fall within a distinct band of data separate from the data areas in which objects other than the real people fall. Thus the data band 1744 can be used to calculate a range of reflectivities for the second filter after the distance is determined and the background light level is known. For example, in a high ambient environment at a distance of 600 mm, the range of reflectivities would be approximately from 26% to 39% reflectance, as can be appreciated from FIG. 9D.

The graphs in FIGS. 9A-9D demonstrate how different reflectivity ranges of human skin apply under different conditions. It is first noted that real people are generally less reflective than representations of people. Second, signal strength varies substantially with distance. Third, reflectance varies noticeably with background lighting levels. Fourth, while the bands generated on the plot have a high correlation to real people versus not real people, there are outliers in the data that do not conform to these distinctions based on reflectivity. Thus the system can be a useful supplement to security systems and for optimizing power consumption by reducing the number of false positive requests for the camera to turn on for facial recognition. Other conclusions from the data will be apparent to one having skill in the art and are not discussed further.

U.S. Provisional Patent Application No. 62/614,303 is incorporated by reference in its entirety. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
performing a first filtering including:
transmitting an optical signal from a ranging sensor;
receiving a return optical signal with the ranging sensor;
determining a distance from the return optical signal;
comparing the distance to a first distance threshold and a second distance threshold;
comparing the distance to a third distance threshold in response to the distance being at least less than the first distance threshold or greater than the second distance threshold; and
outputting a warning that a field of view of a camera is potentially blocked in response to the distance being less than the third distance threshold, the third distance threshold being less than the first distance threshold and the second distance threshold; and
performing a second filtering in response to the distance being between the first distance threshold and the second distance threshold, the performing the second filtering including:
determining a reflectivity value from a signal strength of the return optical signal and the distance;
comparing the reflectivity value with a first reflectivity threshold and a second reflectivity threshold; and
outputting a skin confirmation signal in response to the reflectivity value being within the first reflectivity threshold and the second reflectivity threshold.

2. The method of claim 1 wherein outputting the skin confirmation signal in response to the reflectivity value further includes outputting the skin confirmation signal in response to the reflectivity value being within or equal to the first and second reflectivity thresholds.

3. The method of claim 1, further comprising:
outputting a distance confirmation signal in response to the distance being within the first distance threshold and the second distance threshold.

4. The method of claim 3 wherein outputting the distance confirmation signal in response to the distance further includes the distance being within or equal to the first and second distance thresholds.

5. A device, comprising:
a ranging sensor system that in operation:
transmits an optical signal within a selected wavelength range;
receives a return optical signal;
determines a reflectivity value from a signal strength of the return optical signal;
compares the reflectivity value with a first reflectivity threshold and a second reflectivity threshold; and
outputs a skin confirmation signal in response to the reflectivity value being within the first reflectivity threshold and the second reflectivity threshold;
a facial recognition system including:
an autofocusing subsystem that in operation:
focuses on an object in response to the reflectivity value being within the first reflectivity threshold and the second reflectivity threshold;
an image sensor in electrical communication with the autofocusing subsystem, the image sensor that in operation:
performs a facial recognition process in response to the reflectivity value being within the first reflectivity threshold and the second reflectivity threshold.

6. The device of claim 5 wherein the ranging sensor system includes a ranging sensor that is a time-of-flight (TOF) sensor.

7. The device of claim 5 wherein the ranging sensor system determines a distance value from the return optical signal.

8. The device of claim 7 wherein the ranging sensor system compares the distance value to a first threshold distance and as second threshold distance.

9. The device of claim 7 wherein the ranging sensor system determines a distance between a ranging sensor of the ranging sensor system and a face, and wherein a processor is in electrical communication with the ranging sensor and is configured to determine a real size of the face imaged by the camera based on the distance between the ranging sensor and the face.

10. The device of claim 5, further comprising a camera coupled the ranging sensor system.

11. The device of claim 5 wherein the first reflectivity threshold is a first reflectance of the face of 35% and the second reflectivity threshold is a reflectance of the face of 55%.

12. The device of claim 5, further comprising a camera coupled to a processor.

13. The device of claim 5 wherein the ranging sensor system has a multiple zone array of sensors, and wherein a processor is in electrical communication with the ranging sensor system and is configured to determine if an array of distances detected by the ranging sensor corresponds to a shape of a face.

14. The device of claim 5 wherein the image sensor in operation activates in response to the reflectivity value being within the first reflectivity threshold and the second reflectivity threshold.

15. The device of claim 5, further comprising a processor in electrical communication with the ranging sensor system and the facial recognition system.

16. A method, comprising:
determining a distance between a device and a face of a user with a ranging sensor in the device;
determining a reflectivity of the face of the user;
determining if the distance between the device and the face of the user is within a range of distances;
determining if the reflectivity of the face of the user is within a range of reflectance;
determining if the distance is less than a selected distance in response to the distance being outside the range of distances; and outputting a warning that a field of view of a camera of the device is potentially blocked in response to the distance being less than the selected distance and being outside the range of distances.

17. The method of claim 16, further comprising:

activating a camera in the device based on the distance between the device and the face of the user being within the range of distances and the reflectivity of the face of the user within the range of reflectance, the camera having an overlapping field of view with the ranging sensor; and performing facial recognition of the user in response to activating the camera.

18. The method of claim 17, further comprising:

determining a real size of the face of the user from a captured image of the face of the user based on the distance between the between the device and the face of the user.

19. The method of claim 17 wherein determining if the reflectivity of the face of the user is within the range of reflectance further comprising:

determining if a level of reflectance of a ranging signal transmitted from and received at the ranging sensor corresponds to the range of reflectivity, the range of reflectivity being for human skin tones.

20. The method of claim 17, further comprising:

capturing an image of the face of the user; and comparing the captured image of the face of the user with a stored image of the face of the user.

21. A device, comprising:

a ranging sensor configured to detect a distance between the device and a face of a user and configured to detect a reflectivity of the face of the user;

a processor configured to determine if the distance between the device and the face of the user is within a range of distances, configured to determine if the reflectivity of the face of the user is within a range of reflectance, and configured to generate a warning if the distance is outside the range of distances and is less than a selected distance; and a face recognition camera configured to capture an image of the face of the user when the processor determines that the distance between the device and the face of the user is within the range of distances and the reflectivity of the face of the user is within the range of reflectance.

22. The device of claim 21 wherein the range of distances corresponds to a range of distances between the ranging sensor and the face of between 30 cm and 70 cm.

23. The device of claim 21 wherein the processor is configured to determine a real size of the face imaged by the camera based on the distance between the device and the face and to compare the real size to stored sizes of faces.

24. The device of claim 21 wherein the ranging sensor is a multiple zone ranging sensor and the processor is configured to generate a depth map of the face and to compare the depth map to a stored depth map.

25. The device of claim 21 wherein the ranging sensor is configured to detect a reflectivity of the face based on a power level of a return signal, the reflectivity of the face compared to the range of reflectance, the range of reflectance being for reflectance levels of human skin.

* * * * *